(12) United States Patent
Svec

(10) Patent No.: US 10,798,039 B2
(45) Date of Patent: Oct. 6, 2020

(54) INTELLIGENT REAL-TIME SMTP ROUTING

(71) Applicant: salesforce.com, Inc., San Francisco, CA (US)

(72) Inventor: Brandon Svec, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 84 days.

(21) Appl. No.: 16/050,594

(22) Filed: Jul. 31, 2018

(65) Prior Publication Data

US 2020/0045005 A1 Feb. 6, 2020

(51) Int. Cl.
*H04L 12/58* (2006.01)
*H04L 29/12* (2006.01)
*H04L 12/741* (2013.01)

(52) U.S. Cl.
CPC .............. *H04L 51/14* (2013.01); *H04L 45/74* (2013.01); *H04L 51/12* (2013.01); *H04L 51/22* (2013.01); *H04L 51/28* (2013.01); *H04L 61/1511* (2013.01)

(58) Field of Classification Search
CPC ... H04L 51/12; H04L 63/126; H04L 63/1433; H04L 51/04; H04L 51/14; H04L 51/34; H04L 63/0442; G06C 10/107
See application file for complete search history.

(56) References Cited

U.S. PATENT DOCUMENTS

| | | | | |
|---|---|---|---|---|
| 8,171,083 B2* | 5/2012 | Collet | ..................... | H04L 51/00 709/206 |
| 8,224,902 B1* | 7/2012 | Glasser | ................... | H04L 51/12 709/206 |
| 9,246,707 B2* | 1/2016 | Swamidass | .......... | G06Q 10/107 |
| 9,262,751 B1* | 2/2016 | Wheeler | ............. | G06Q 10/107 |
| 9,686,308 B1* | 6/2017 | Srivastava | ............. | H04L 51/12 |
| 2002/0078158 A1* | 6/2002 | Brown | ............. | H04L 29/06027 709/206 |
| 2003/0074408 A1* | 4/2003 | Clark | ..................... | H04L 51/28 709/206 |
| 2003/0153302 A1* | 8/2003 | Lewis | ..................... | H04L 51/12 455/412.1 |
| 2004/0230657 A1* | 11/2004 | Tomkow | ................. | H04L 51/30 709/206 |
| 2005/0015450 A1* | 1/2005 | Keohane | ............. | G06Q 10/107 709/206 |
| 2006/0164992 A1* | 7/2006 | Brown | ................ | H04L 41/0896 370/235 |

(Continued)

*Primary Examiner* — Oanh Duong
(74) *Attorney, Agent, or Firm* — Butzel Long

(57) ABSTRACT

A dynamic relay makes real-time decisions about routing to mail transfer agents (MTAs) of email envelopes received by the relay from an SMTP email server. Those decisions can be based on one or more factors, such as MTA respective statuses. They can also be based on information contained in x-header fields provided in the email messages' respective headers (e.g., identifying the individual/entity (or "client") for whom the email envelope is being generated and/or an IP address of the MTA to select for load balancing or otherwise). This allows, for example, the relay to select among available MTAs for delivery of each message in order to segregate email message traffic for load-balancing and/or based on preferences of specific MTAs for specific clients, or otherwise, while bypassing MTAs that have been blacklisted or are suffering delays.

15 Claims, 2 Drawing Sheets

(56) References Cited

U.S. PATENT DOCUMENTS

| | | | |
|---|---|---|---|
| 2006/0168057 A1* | 7/2006 | Warren | H04L 51/12 |
| | | | 709/206 |
| 2007/0011324 A1* | 1/2007 | Mehr | G06Q 10/107 |
| | | | 709/225 |
| 2007/0106783 A1* | 5/2007 | Pearson | H04L 51/00 |
| | | | 709/224 |
| 2007/0107059 A1* | 5/2007 | Chasin | H04L 63/126 |
| | | | 726/23 |
| 2009/0067414 A1* | 3/2009 | Toscano | H04L 51/066 |
| | | | 370/353 |
| 2010/0250691 A1* | 9/2010 | Tomkow | H04L 51/30 |
| | | | 709/206 |
| 2010/0318555 A1* | 12/2010 | Broder | G06Q 10/107 |
| | | | 707/769 |
| 2013/0191484 A1* | 7/2013 | Kinoshita | H04L 51/14 |
| | | | 709/206 |
| 2013/0238715 A1* | 9/2013 | Sanyal | H01L 51/00 |
| | | | 709/206 |
| 2013/0238719 A1* | 9/2013 | Gourevitch | H04L 51/14 |
| | | | 709/206 |
| 2015/0067069 A1* | 3/2015 | Gourevitch | H04L 51/26 |
| | | | 709/206 |
| 2016/0344770 A1* | 11/2016 | Verma | G06N 20/00 |
| 2018/0219819 A1* | 8/2018 | O'Brien | H04L 51/18 |
| 2018/0219830 A1* | 8/2018 | O'Brien | H04L 51/12 |

* cited by examiner

INTELLIGENT REAL-TIME SMTP ROUTING

BACKGROUND OF THE INVENTION

The invention pertains to routing email traffic. It has particular application, for example in allocating resources with which to route email messages within data centers from which those emails originate.

Under the ubiquitous SMTP protocol, email messages are typically routed over the Internet from senders' email servers to the recipients' email servers (or mail delivery agents) via mail transfer agents or MTA's. These are disposed between the email servers and delivery agents and act as relays that define the messages' respective paths, queuing and forwarding each message to an IP address of the next unit in that path. That address may be determined from a lookup on the DNS server and/or static routing configuration files maintained on the MTAs.

Mail transfer agents can be bottlenecks to email delivery. For example, unless it has sufficient throughput capacity, an MTA can slow routing of emails, e.g., if it receives a deluge of them from upstream servers (or other MTAs) during an email campaign. Worse, if a particular MTA has been "blacklisted," e.g., as a result of having previously routed spam or other questionable emails, downstream mail delivery agents (or other MTAs) may refuse to accept emails from the blacklisted unit.

BRIEF SUMMARY

Implementations of the disclosed subject matter provide a dynamic relay makes real-time decisions about routing to mail transfer agents (MTAs) of email envelopes received by the relay from an SMTP email server. Those decisions can be based on one or more factors, such as MTA respective statuses. They can also be based on information contained in x-header fields provided in the email messages' respective headers (e.g., identifying the individual/entity (or "client") for whom the email envelope is being generated and/or an IP address of the MTA to select for load balancing or otherwise). This allows, for example, the relay to select among available MTAs for delivery of each message in order to segregate email message traffic for load-balancing and/or based on preferences of specific MTAs for specific clients, or otherwise, while bypassing MTAs that have been blacklisted or are suffering delays.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Figure 1:
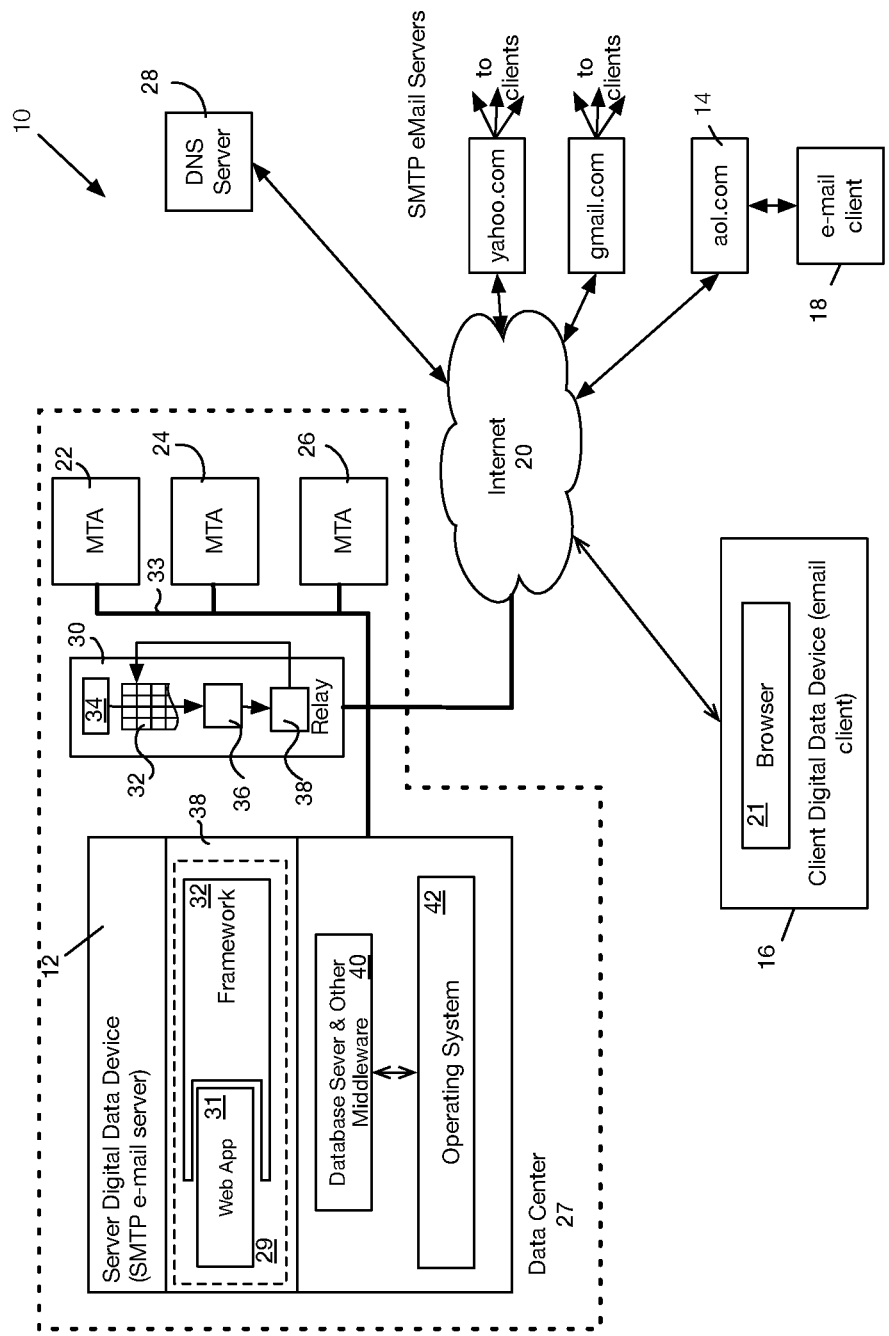
FIG. 1 depicts a digital data processing system of the type providing an example embodiment, including a relay disposed between a sending email server and multiple mail transfer agents (MTAs) in a data center.

FIG. 1 depicts a digital data processing system 10 of the type providing an example embodiment that includes email server digital data devices ("servers" or "server devices") 12, 14, client digital data devices ("clients" or "client devices") 16, 18, mail transport agents (MTAs) 22, 24, 26, domain name server (DNS) 28, and dynamic relay 30, all coupled for at least intermittent and, preferably, substantially continuous communication as shown. In the illustrated embodiment, the server 12, MTAs 22-26 and relay 30 are co-housed in a data center 27, though, other embodiments may vary in this regard.

Devices 12-18 comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type known in the art as adapted in accord with the teachings hereof to perform the respective functions and operations ascribed thereto herein and (ii) communicating over network 20 to one or more of the other devices 12-18 in the conventional manner known in the art as adapted in accord with the teachings hereof. Those communications can be direct (e.g., via network 20) and/or via network 33 and/or one or more of the other illustrated devices 22-26 in a conventional manner known in the art as adapted in accord with the teachings hereof.

Thus, for example, device 12 executes web server software 29 that responds to requests in HTTP or other protocols for transferring web pages and other digital content to a requesting device, e.g., client 16, over network 20, in the conventional manner known in the art as adapted in accord with the teachings hereof. The web server 29 can also respond to requests in such protocols for carrying out user-requested activities, also, in the conventional manner known in the art as adapted in accord with the teachings hereof.

In the illustrated embodiment, web server 29 comprises web application 31 executing on device 12 within and/or in connection with a web application framework 32. Web application 31 comprises conventional such software known in the art as adapted in accord with the teachings hereof for effecting specific behavior by the server 12 in response to requests from the client 16 at the behest of users thereof. Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, only one of which is shown here (to wit, web application 31).

In the illustrated embodiment, web server 29 and its constituent components, web application 31 and web application framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 29 from client 16. Those other layers can include, for example, a data layer (which provides services supporting interaction with a database server and/or other middleware 40 in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated and described here.

Although, it may perform other functions, for intents and purposes relevant to this application, web server 29 and, more generally, server digital data processor 12 of the illustrated embodiment functions and operates as a conventional email rendering engine or "email server"—and, more particularly, in the illustrated embodiment, a simple mail transport protocol (SMTP) renderer/server (hereinafter, simply, "email server" or "SMTP server")—of the type known in the art as adapted in accord with the teachings hereof.

Thus, for example, web application 31 provides a client device-facing front-end that facilitates the creation, viewing and administration of email messages and, along with framework 32 and other components of device 12 (e.g., middleware 40 and/or operating system 42), facilitates the encoding and transmission over networks 20, 33 per the SMTP protocol of email messages created at the request of a user of device 16 and that facilitates the decoding of email received via those networks per that same protocol from other devices—all in the conventional manner known in the art as adapted in accord with the teachings hereof.

With continued reference to FIG. 1, client device 16 of the illustrated embodiment executes a browser or other application 21 that typically operates under user control to generate requests in HTTP or other protocols and to transmit those requests to web server 29 over network 20. The browser/web app 21 can also facilitate user interaction with the web server 29, e.g., by presenting content received from the server 29 to the user and/or returning to the server 29 user responses to that content—all in the conventional manner known in the art as adapted in accord with the teachings hereof.

Although it may perform other functions, for intents and purposes relevant to this application, browser/app 21 and, more generally, client digital data processor 16 of the illustrated embodiment functions and operates as a conventional email client of the type known in the art as adapted in accord with the teachings hereof. Thus, for example, the browser/app 21 provides an interface for initiating and managing action by email server 12 for the creation and/or administration of e-mail messages, and so forth—all conventional manner known in the art as adapted in accord with the teachings hereof.

Although email server 12 and email client 16 of the illustrated embodiment communicate via HTTP protocol, it will be appreciated that in other embodiments they may communicate via other protocols, industry-standard, proprietary or otherwise—and, likewise, that either server digital data processor 12 and/or client 16 may be architected other than as a web server and/or web application, respectively. And, although the functions of email client and email server are split between two devices, to wit, devices 12, 16, in the illustrated embodiment, in other embodiments those functions may be split among still more devices or combined into a single device, all in a conventional manner known in the art as adapted in accord with the teachings hereof.

Email server 14 functions as a conventional SMTP email server of the type known in the art, and email client 18, also as a conventional such device known in the art. They can be constructed and operated in the manner of email server 12 and email client 16, respectively, or otherwise. By way of example, email server 14 can be of the type commercially operated by the likes of yahoo.com, aol.com, hotmail.com, and a host of other email service providers, well-known or otherwise, for receiving emails sent to their respective customers. In the discussion herein, server 14 is referenced primarily in respect to its role in delivering emails to email client 18. In practice, server 14 may perform other functions, as well. And, although the discussion herein refers to a single such server 14 and a single client 18, many more of both may be coupled for communications to network 20 for delivery and receipt of respective emails.

Mail transport agents 22-26 route email messages formatted (or "encoded") in accord with the SMTP protocol through networks 20, 33 from a sender SMTP server, e.g., server 12, to a recipient SMTP server, e.g., server 14. The MTAs can be conventional such devices of the type known in the art as adapted in accord with the teachings hereof. Thus, for example, MTAs can be SMTP relays or any of a variety of other devices that perform IP-based or other routing of SMTP email envelopes, all as adapted in accord with the teachings hereof.

Domain name server (DNS) 28 comprises a conventional such device known in the art that responds to requests from MTAs and other devices by providing the internet protocol (IP) address and/or other routing information of the email server of the recipient of an email contained in an SMTP envelope. DNS 28 may provide other functions conventional to such devices known in the art, as well.

Network 20 comprises one or more networks suitable for supporting communications between devices 12-18, 22-30. The network comprises one or more arrangements of the type known in the art, e.g., local area networks (LANs), wide area networks (WANs), metropolitan area networks (MANs), and or Internet(s) (hereinafter, collectively, the "internet"). Per convention in the art, the network 20 can itself include MTAs of the variety discussed herein or otherwise.

The devices 12-30 of the illustrated embodiment may be of the same type, though, more typically, they constitute a mix of devices of differing types. And, although two server digital data devices 12, 14 are depicted and described here, it will be appreciated that other embodiments may utilize a greater number of these devices, homogeneous, heterogeneous or otherwise, networked or otherwise, to perform the functions ascribed hereto to web server 29 and/or email server 12. Likewise, although two client devices 16, 18 are shown, it will be appreciated that other embodiments may utilize a greater number of those devices, homogeneous, heterogeneous or otherwise, running applications (e.g., 44) that are, themselves, as noted above, homogeneous, heterogeneous or otherwise. Moreover, one or more of devices 12-18 may be configured as and/or provide a database system (including, for example, a multi-tenant database system) or other system or environment; and, although shown here in a client-server architecture, the devices 12-18 may be arranged to interrelate in a peer-to-peer, client-server or other protocol consistent with the teachings hereof.

In embodiments where they are housed in a common data center or otherwise, server 12, MTAs 22-26 and relay 30 can be coupled for communications with one another, as well as with network 20, via network 33, which can comprise CAT 5e, fiber optic, or other structured cabling of the type supporting data communications within a data center or otherwise. Email messages generated by the server 12 are routed over network 33 to dynamic relay 30 and, from there, to one or more of the MTAs 22-26 for transmission over network 20 (e.g., the Internet) to a receiving SMTP email server, e.g., 14.

Dynamic relay 30 can be a stand-alone unit, as shown in the drawing, comprising a conventional digital data device of the type commercially available in the marketplace suitable as a network device, or otherwise, adapted for (i) executing software of the type known in the art as adapted in accord with the teachings hereof to perform the functions and operations ascribed thereto herein and (ii) communicating over network 33 to one or more of the other devices 12-18, 22-28 in the conventional manner known in the art as adapted in accord with the teachings hereof. Alternatively or in addition, the relay 30 or portions of the functionality thereof can be co-housed and/or otherwise incorporated into that of one or more of the other elements 12-28. Although only one relay 30 is shown in the drawing, some embodiments utilize multiple such devices to service a common set of SMTP servers and/or a single SMTP server with a high volume of output.

As those skilled in the art will appreciate the "software" referred to herein—including, by way of non-limiting example that executing on relay 30—comprise computer programs (i.e., sets of computer instructions) stored on transitory and non-transitory machine-readable media of the type known in the art as adapted in accord with the teachings hereof, which computer programs cause the respective devices to perform the respective operations and functions attributed thereto herein. Such machine-readable media can include, by way of non-limiting example, hard drives, solid state drives, and so forth, embedded with and/or coupled for communications to the respective digital data devices in the conventional manner known in the art as adapted in accord with the teachings hereof.

With continued reference to FIG. 1, dynamic relay 30 makes intelligent real-time decisions about the routing of email envelopes received by it and, more specifically, about which of MTAs 22-26 to which to send those envelopes to route them (via internet 20) to recipient email servers, e.g., 14. In the illustrated embodiment, this is based on one or more factors such as (i) the MTA respective statuses, (ii) information in the email message's respective headers, such as addressee domain and client ID, by way of non-limiting example, and as further discussed below. This allows, for example, relay 30 to select among available MTAs for delivery of each message, load-balancing deliveries to them if desirable or necessary in instances where multiple messages are being sent, while bypassing MTAs that have been blacklisted or are suffering delays. Other embodiments may use other factors instead or in addition. The dynamic relay 30 thus allows for segregation of email traffic received from the SMTP server 12 and, therefore, better allocation of data center resources, e.g., MTAs 22-26, dedicated to transferring those emails, via network 20, to recipient email servers. This is advantageous, for example, in data centers that have multiple SMTP servers that generate email messages and multiple relays 30 for routing those messages, esp., for example, when those email messages are generated for a variety of clients and/or are directed to a variety of recipients.

Illustrated relay includes status table 32, status query functionality 34, decision engine 36, and routing control module 38 interconnected as indicated and operating as discussed below. Status table 32, which can be implemented as an indexed table, a linked list, a database or other data collection in on-board memory, attached storage, networked storage or otherwise, maintains information about MTAs that are candidates for use in routing email envelopes received by the server, e.g., MTAs 22-26, for illustrative purposes.

For each such MTA, the information maintained in the table 32 can include, by way of non-limiting example, one or more of the following items (i.e., "characteristics"), along with a weighting factor numerically indicative of the significance of that characteristic to a routing decision. As evident above, some of the characteristics provided for each MTA define envelope-specific requirements or limitations of the MTA, while others are envelope-independent:

- the MTA's IP address (or "sending" address, i.e., the IP address presents to downstream MTA's or the recipient's email server when attempting to make SMTP connections to deliver an email message) and/or other routing information,
- the MTA's status (e.g., blacklisted, unavailable, warming-up),
- the permissibility of using the MTA to transfer email envelopes having specified characteristics (e.g., length of envelope, type of attachment, etc.)
- the permissibility of using the MTA to transfer email envelopes destined to specified types of recipients,
- the permissibility of using the MTA with a particular originating domain or related individual/entity ("client")
- MTA throughput capacity,
- routing times, e.g., from relay 30 to MTA and/or from relay to envelope destination via MTA,
- workload (e.g., time since most recent envelope),
- time of last envelope received from relay 30,
- an aggregate count of envelopes sent to the MTA by relay 30 or otherwise (i.e., a "send volume" handled by that MTA),
- a rate at which prior envelopes have been sent to the MTA by relay 30 (i.e., a "routing rate")
- IP addresses (or canonical names) of recipients in envelope(s) recently received by the MTA from relay 30, and/or
- other values that serve as predictors of the speed, permissibility and/or favorability of effecting transfer of an email envelope through the MTA.

In embodiments in which multiple relays 30 service common SMTP server(s), the table 32 can be stored in a single network location commonly accessible by the multiple relays and/or can be stored in a distributed fashion in the manner known in the art for common data tables utilized by multiple network devices, as adapted in accord with the teachings hereof.

Status query functionality 34 of the illustrated embodiment populates table 32 with the information discussed above. To that end, the functionality 34 performs discovery functions, e.g., upon boot-up of relay 30 and/or periodically or episodically thereafter, to discern information of the type discussed above for loading into table 32. To that end, the functionality can query the MTAs 22-26 themselves, the servers 12, 14, clients 16, 18, DNS server 28 or other devices on networks 20, 33 or otherwise in communications coupling with relay 30. In some embodiments, functionality 34 can also obtain that information from decision engine 36, routing control module 38 and/or from envelopes routed through relay 30 itself. Functionality 34 can also provide an interface for querying and/or otherwise accepting such information from an administrator and/or a configuration file. This can include, for example, the aforementioned weighting factors.

Query functionality 34 comprises software and/or hardware module(s) executing on relay 30 in the conventional manner of special- or general-purpose network devices known in the art as adapted in accord with the teachings hereof. Implementation of software and/or hardware module(s) providing such functionality is within the ken of those skilled in the art in view of the teachings hereof.

Decision engine 36 facilitates routing email envelopes received by relay 30 by comparing information in and about the envelope—e.g., provided by routing control module 38—with information provided in table 32. By way of non-limiting example, by comparing characteristics of a received envelope (e.g., envelope length and/or attachment type) with entries in the table, the engine 36 can return the IP address of the "best" of MTAs 22-26 to which to send that envelope. By way of further non-limiting example, for successive email envelopes received by relay 30 that are part of an email campaign (e.g., as evident in attachment types, email length, timing of receipt of the successive email envelopes by relay 30, etc., or otherwise), the engine 36 can return IP addresses of successive ones of the MTAs 22-26 to which to send those envelopes so as to balance load among them. By way of still further non-limiting example, by comparing information provided in an "x-header" field of an email envelope received by relay 30 (e.g., information such as domain, virtual MTA (VMTA) identification or clientID), the decision engine 36 can return the IP address of the MTA, e.g., 22, to which to send that envelope.

Engine 36 comprises software and/or hardware module(s) executing on relay 30 in the conventional manner of special- or general-purpose network devices known in the art as adapted in accord with the teachings hereof. Although engine 36 is shown only in relay 30 in the illustrated embodiment, in other embodiments some or all of its functionality may be provided on other devices, e.g., server 12 or otherwise. In such instances, illustrated engine 36 may utilize an applications program interface or other communications mechanism to transfer information to/from that other functionality. By executing engine 36 behind an API on other devices (e.g., server 12 or otherwise) the data center 27 can more readily support multiple relays 30 that all act upon the same configuration and state data, thereby, facilitating scaling of the data center 27 to support, e.g., multiple SMTP servers. Implementation of software and/or hardware module(s) providing such functionality is within the ken of those skilled in the art in view of the teachings hereof.

Routing control module 38 is coupled with the network interface of relay 30 to receive email envelopes, e.g., from server 12, and to route those envelopes to selected ones of MTAs 22-26 based on routing information (e.g., IP addresses) supplied by decision engine 36. To that end, module 38 supplies information from each envelope (e.g., envelope source, email sender, specified recipients, information from x-header and other fields of the envelope, envelope length, attachment types (if any), all by way of non-limiting example) to decision engine 36 and receives therefrom an IP address of an MTA to which to route the envelope. In addition to information from the envelope, module 38 can obtain from DNS server 28 and supply to decision engine 36 routing information for recipients specified in the envelope.

Module 38 is also responsible for updating the envelopes in accord with the SMTP protocol specifications, e.g., as those envelopes move through buffers (not shown) of relay 30, all in the conventional manner of email envelope routing applicants conventional in the art as adapted in accord with the teachings hereof. This includes modifying the header to identify to the selected MTA (upon its receipt of the envelope) the IP address it is to spoof, if any, when forwarding the email on network 20 to downstream MTAs, servers or other components.

Figure 2:
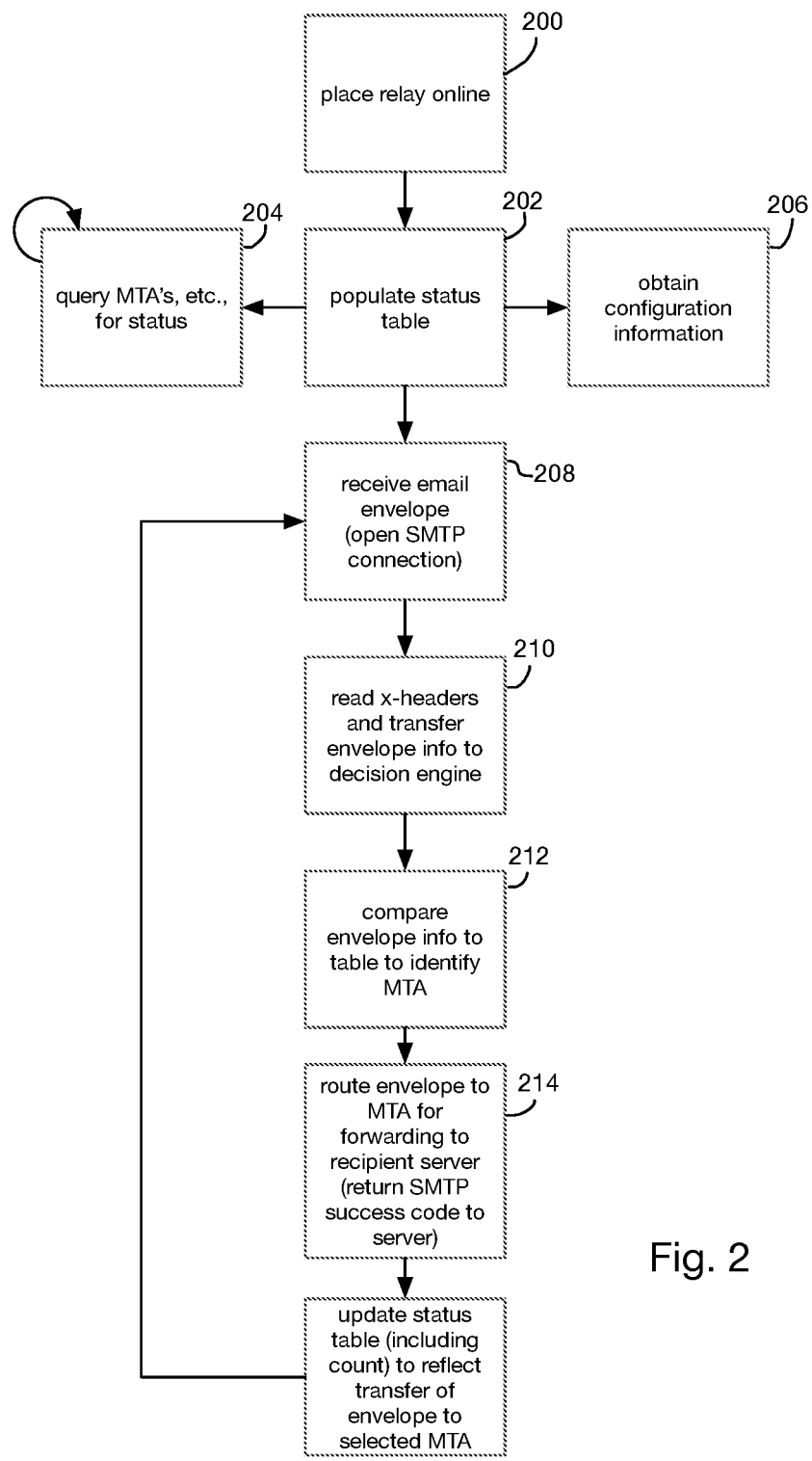
FIG. 2 is a flow chart depicting operation of the relay shown in FIG. 1.

FIG. 2 depicts operation of the relay 30 of FIG. 1.

In step 200, the relay is placed online in the conventional manner known in the art for a network device intended to serve as an intermediary between an email sender server, e.g., 12, and MTAs 22-26 that will forward email envelopes downstream to other MTAs, servers or other network components—all as adapted in accord with the teachings hereof.

In step 202, the status query functionality 34 populates the status table 32. To that end, the functionality 34 performs discovery functions to discern information of the type discussed above in connection with FIG. 1 vis-à-vis table 32, as particularly adapted in accord with the specifics of the implementation As discussed above, this can include querying the MTAs 22-26 themselves, the servers 12, 14, clients 16, 18, DNS server 28 or other devices on networks 20, 33 or otherwise in communications coupling with relay 30 for that information. See step 204. This can be done on boot-up of relay 30 and periodically (e.g., every second, minute, hour or otherwise) or episodically (e.g., upon receipt or transmission of each email envelope or batch thereof) thereafter. Such querying within the ken of those skilled in the art in view of the teachings hereof.

As noted above, the status query functionality 34 can also populate the status table 32 by obtaining information (e.g., MTA characteristics) by querying and/or otherwise accepting that information from an administrator, e.g., vis-à-vis a web interface, configuration files or otherwise, all in the conventional manner of the art of network device configuration, as adapted in accord with the teachings hereof. See step 206.

In some embodiments, status query functionality 34 can populate the status table 32 with information from decision engine 36, routing control module 38 and/or from envelopes routed through relay 30 itself. In the illustrated embodiment, such information is pushed to the table 32, e.g., by the routing control module 38; although, other embodiments may vary in this regard.

As noted above, in embodiments in which table 32 is maintained in distributed fashion for access by multiple relays 30, the query functionality 34 can populate the distributed table in the manner known in the art for distributed data tables utilized by multiple network devices, as adapted in accord with the teachings hereof.

In step 208, the relay 30 receives an email envelope from a sending server 12 after the latter has opened an SMTP connection with the former. The envelopes can be generated and transmitted via that network 33 to relay 30 by server 12 and, more particularly, for example, web application 31 in cooperation with client 16 and, more particularly, for example, browser/app 21, at the request of a user thereof, in the conventional manner known in the art as adapted in accord with the teachings hereof. The envelopes of the illustrated embodiment are formatted (or encoded) in accord with the SMTP protocol and, in the illustrated embodiment, can include, in their headers, "x-header fields," proprietary of otherwise, that define one or more of following by way of non-limiting example:

an identify individual/entity ("client") for whom the email envelope is being generated, an IP address that a selected MTA is to spoof upon forwarding the envelope on the network 20, and IP address of the relay 30 MTA to select for load balancing or otherwise.

Such x-header fields can be specified, for a specific email, for a batch of emails, as a default for all email or otherwise, by the user of browser/app 2, an administrator of server 12 and/or client 16, or otherwise. The inclusion of such x-header fields within envelopes generated and transmitted by server 12 is within the ken of those skilled in the art in view of the teachings hereof. In the illustrated embodiment, relay 30 leaves the SMTP connection with the server 12 open even after the email envelope is received (instead, closing it in step 214), though other embodiments may vary in this regard.

In step 210, the relay 30 and, more particularly, the routing control module 38, reads x-header fields and other information from the envelope and transfers it to decision engine 36. This can be by way of object invocation, function call, remote procedure call, API call or otherwise, as per convention in the art in accord with the implementation, and as adapted in accord with the teachings hereof. The information read from the envelope and transferred to the decision engine 36 can include, for example, one or more of: sender domain, recipient domain(s), client identity (e.g., from an x-header field), preferred IP address of the MTA to be selected by the decision engine (e.g., from an x-header field). The aforesaid reading and transfer of information from email envelopes is within the ken of those skilled in the art in view of the teachings hereof.

In step 212, the relay 30 and, more particularly, the decision engine 36 evaluates information received from the routing control module 38 regarding each incoming email envelope (e.g., the fact that it has been received for routing, the time receipt (absolute or relative to the last received envelope), as well as its other attributes) in view of characteristics provided in the table 32 regarding the MTAs 22-26 in order to select an appropriate one of them to which to send that envelope so that it can be routed to the recipients identified in the envelope.

In the illustrated embodiment, the evaluation is quantitative and involves assigning and summing weighting factor-weighted values resulting from evaluation of each individual characteristics of each MTA, including both those that are envelope attribute-specific (e.g., the permissibility of using the MTA to transfer email envelopes having specified characteristics, destined to specified types of recipients, and/or originating at a particular domain or client), as well as those that are not (e.g., MTA status, MTA throughput capacity, MTA routing times, MTA workload, time of last envelope received from relay, send volume, routing rate), all as within the ken of those skilled in the art in view of the teachings hereof.

By way of non-limiting example, on receipt of a new envelope for routing by the relay 30, the decision engine 36 can quantitatively evaluate it against the characteristics of MTAs 22-26. Depending on how highly weighted is the send volume characteristic, it may tilt the evaluation to the MTA having the lowest number of counts (i.e., the lowest volume). On the other hand, other factors (such as MTA throughput, etc.) may result in an MTA with a higher send volume being selected. Similarly, if the weighting factor associated with the send rate (e.g., counts per period of time) of each MTA is high enough, it can effectively cause the decision engine to alternate among MTAs so as to load-balance among them.

By way of further non-limiting example, on receiving an envelope having a x-header field that identifies a specific client as the sender, a high weighting factor for the corresponding MTA characteristic can cause the decision engine 36 to choose an otherwise low-throughput MTA for that envelope, even though other MTAs might be suitable (and, even better) for routing it to the recipient server, e.g., 14.

By way of a still further non-limiting example, a large weighting factor applied to the "unavailable" or "black-listed" characteristics of an MTA can effectively prevent the decision engine 36 from selecting an unavailable or blacklisted MTA under any circumstance. Similarly, large weighting factors applied "warming" characteristics and to aggregate count or send rate characteristics can cause the decision engine to select alternate MTAs for successively received email envelopes to ensure that they are properly "warmed up."

By way of a still yet a further non-limiting example, a suitable weighting factor applied to an IP address characteristic can cause the decision engine to select, for an envelope having an x-header that specifies a particular MTA IP address, an MTA having the matching such address regardless of other envelope attributes and MTA characteristics—except, perhaps, an "unavailable" characteristic.

Such evaluation and selection of MTAs based on email envelopes attributes is within the ken of those skilled in the art in view of the teachings hereof. In embodiments in which table 32 is maintained in distributed fashion for access by multiple relays 30, the decision engine 36 can access a closest or otherwise appropriate table for making routing decisions in the manner known in the art for distributed data tables utilized by multiple network devices, as adapted in accord with the teachings hereof.

In step 214, the routing control module 38 modifies the current email envelope and takes such other steps as are necessary to route it to the selected MTA 22-26—all in the conventional manner known in the art as adapted in accord with the teachings hereof. Thus, for example, if an x-header field specifies an IP address that a selected MTA is to spoof upon forwarding the envelope on the network 20, the routing control module 38 modules the header accordingly. In the illustrated embodiment, the relay 30 sends an SMTP code, e.g., code 250, to server 12 if the envelope was successfully routed to the selected MTA (or, for example, a 5xx code if not successful), thereby closing the SMTP transaction opened in step 208; other embodiments may vary in this regard.

In step 216, the routing control module 38 updates the status table 32 to reflect transfer of further envelope to selected MTA. This includes, in appropriate implementation, updating a count of email envelopes sent to that MTA and the time when that envelope was sent. Following step 216, the illustrated process repeats for routing of the next email envelope received by the relay 30 from the sending server, e.g., 12.

Described above are embodiments in accord with the teachings hereof. It will be appreciated that these are examples, and that other embodiments incorporating changes to those shown and discussed herein fall within the scope of the claims below.

In view of the foregoing, what I claim is:

1. A method of routing an email comprising receiving, from an email server with an email relay, an email message envelope in accord with an industry-standard simple mail transport protocol (SMTP), selecting, with a decision engine that is in communications coupling with the email relay, a mail transfer agent (MTA) from a plurality of mail transfer agents (MTAs) that are in at least intermittent coupling with the email relay based on a respective status of the plurality of MTAs, wherein MTAs having the status of unavailable or warming up are bypassed, with the decision engine making the selection as a function of a value of a routing rate in a header statement provided in accord with the SMTP protocol in the email message envelope, wherein the routing rate is a rate at which prior email message envelopes have been sent to the MTA, transferring, from the email relay to the selected MTA, the email message envelope in accord with the SMTP protocol, and transferring the email message envelope from the selected MTA to a network that transfers the envelope any of directly and indirectly to a recipient identified in a header statement of the email message in accord with the SMTP protocol.

2. The method of claim 1, the selecting step including selecting the MTA in response to receipt of the email message envelope by the email relay in the receiving step.

3. The method of claim 2, the selecting step including selecting the MTA at a time the email message envelope is received by the email relay in the receiving step.

4. The method of claim 2, the transferring step including transferring the email from the selected MTA to the recipient over an internet.

5. The method of claim 2, comprising tracking a volume of email message envelopes any received in the receiving step performed by a plurality of email relays or transferred in the transferring step performed by a plurality of such relays.

6. The method of claim 5, comprising selecting the MTA as a function of the volume tracked in the tracking step.

7. The method of claim 1, the selecting step including selecting the MTA as a function of a value of any of an addressee domain and a client ID identified in an x-header statement of the email message envelope.

8. The method of claim 1, the selecting step including passing a value in an x-header statement from the email relay to the decision engine to make the selection.

9. The method of claim 1, the selecting step including selecting the MTA to load-balance among at least a subset of the plurality of MTAs.

10. The method of claim 1, the selecting step including selecting the MTA as a function of another of the plurality of MTAs being any of blacklisted or suffering delays.

11. The method of claim 1, including modifying a virtual IP address of the email relay in accord with a value of an x-header statement of the email message envelope provided in accord with the SMTP protocol.

12. A non-transitory machine readable storage medium having stored thereon a computer program configured to cause a digital data device to perform the steps of:

receiving, from an email server with an email relay, an email message envelope in accord with an industry-standard simple mail transport protocol (SMTP), selecting, with a decision engine that is in communications coupling with the email relay, a mail transfer agent (MTA) from a plurality of mail transfer agents (MTAs) that are in at least intermittent coupling with the email relay, based on a respective status of the plurality of MTAs, wherein MTAs having the status of unavailable or warming up are bypassed, with the decision engine making the selection as a function of a value of a routing rate in an x-header statement provided in accord with the SMTP protocol in the email message envelope, wherein the routing rate is a rate at which prior email message envelopes have been sent to the MTA, transferring, from the email relay to the selected MTA, the email message envelope in accord with the SMTP protocol, and transferring the email message envelope from the selected MTA to a network that transfers the envelope any of directly and indirectly to a recipient identified in the x-header statement of the email message in accord with the SMTP protocol.

13. The machine readable storage medium of claim 12, wherein the computer program is configured to cause the digital data device to perform the further steps of selecting step including selecting the MTA in response to receipt of the email message envelope in the receiving step.

14. The machine readable storage medium of claim 12, wherein the computer program is configured to cause the digital data device to perform the further steps of selecting the MTA as a function of a value of any of an addressee domain and a client ID identified in a said x-header statement of the email message envelope.

15. The machine readable storage medium of claim 12, wherein the computer program is configured to cause the digital data device to perform the further steps of passing the value in the x-header statement from the email relay to the decision engine to make the selection.

* * * * *